United States Patent [19]

McMurtry

[11] Patent Number: 5,005,360
[45] Date of Patent: Apr. 9, 1991

[54] SOLAR ENERGY SYSTEM FOR GENERATING ELECTRICITY

[76] Inventor: J. A. McMurtry, 1350 N. 26th St., Mesa, Ariz. 85213

[21] Appl. No.: 483,458

[22] Filed: Feb. 22, 1990

[51] Int. Cl.⁵ .............................................. F03G 6/06
[52] U.S. Cl. ................................... 60/659; 60/641.8; 60/641.15; 439/430; 439/439
[58] Field of Search .................. 60/641.8, 641.15, 659; 126/430, 439

[56] References Cited
U.S. PATENT DOCUMENTS

| | | | |
|---|---|---|---|
| 4,171,617 | 10/1979 | Sakamota et al. | 60/641.8 |
| 4,449,515 | 5/1984 | Nilsson, Sr. | 60/641.15 |

Primary Examiner—Allen M. Ostrager
Attorney, Agent, or Firm—Tod R. Nissle

[57] ABSTRACT

A solar energy system for generating electricity. The system tracks the sun during the day to produce a concentrated beam of light which is focused through a fixed opening in a heat storage chamber. The beam of light pressurizes the chamber and seals the fixed opening to prevent depressurization of the chamber. A closed circuit fluid heat transfer system collects heat from the heat storage chamber and powers a turbine. Heat powers the closed circuit system. A pump is not used in the closed circuit system. The turbine powers an electrical generator.

12 Claims, 1 Drawing Sheet

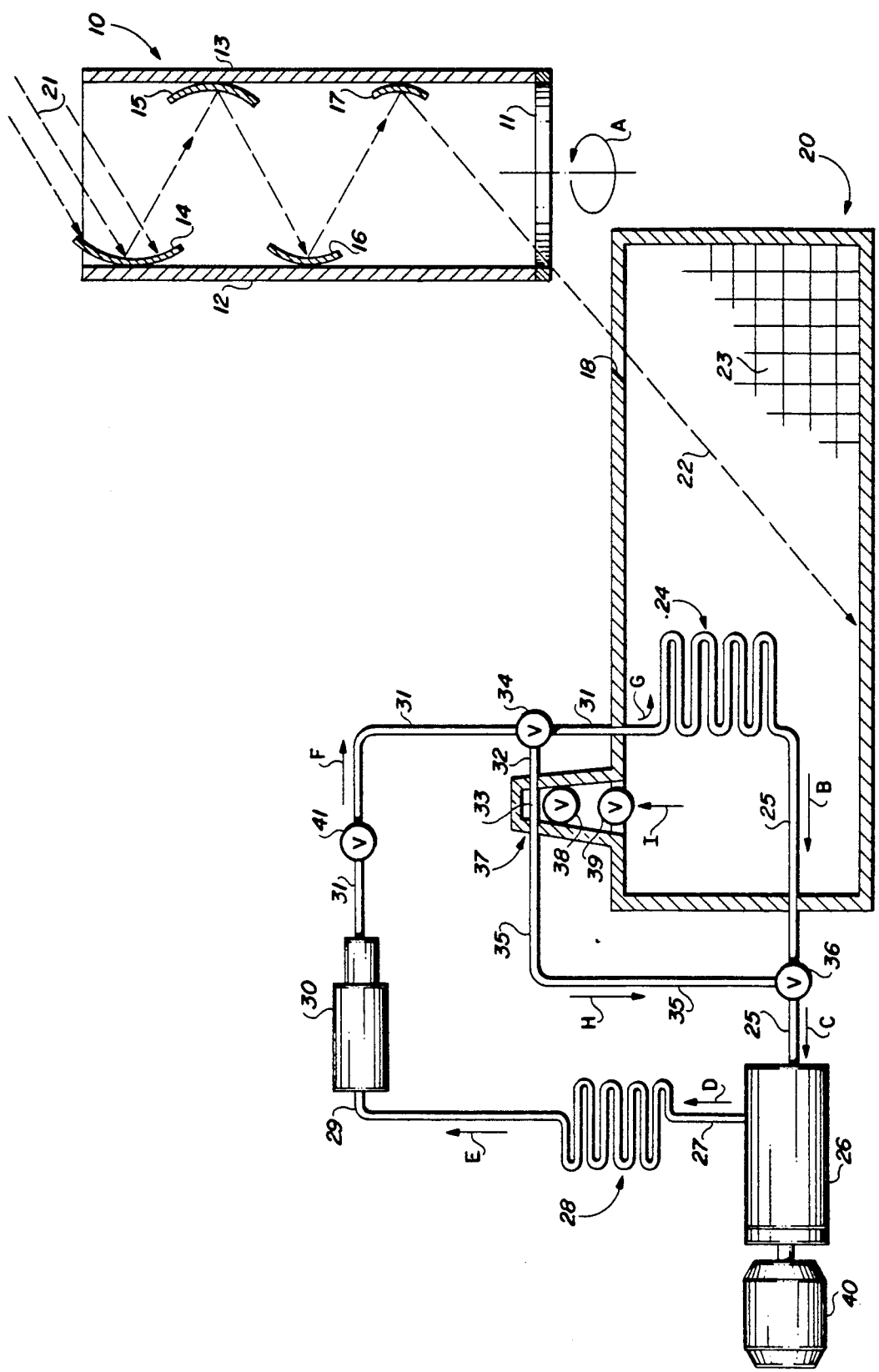

SOLAR ENERGY SYSTEM FOR GENERATING ELECTRICITY

This invention relates to a solar energy system for generating electricity.

More particularly, the invention relates to a solar energy electricity generating system which utilizes a closed fluid circuit to transfer heat utilized to power a turbine and which does not require the use of a pump to circulate the fluid through the closed circuit.

In another respect, the invention relates to a solar energy electricity generating system which, while the sun moves during the daytime through an arc in the sky, continuously moves to follow the sun through the sky to gather and concentrate sunlight and to deliver a concentrated beam of sunlight through a fixed opening into a heat storage chamber to seal and pressurize the heat storage chamber.

In a further respect, the invention relates to a solar energy electricity generating system which can produce about 500,000 kilowatts per hour in a facility which covers a five acre area and which utilizes electrical generators which occupy a small restricted space which is two feet high, two feet wide, and four feet long.

The use of solar energy to generate electricity is well known. Numerous such solar energy systems have been proposed. Existing solar energy systems suffer from disadvantages which tend to make the systems uneconomical. First, solar energy systems typically require large land areas in which to position the panels which receive and absorb sunlight and absorb the heat produced by the sunlight. Second, the 10,000, 20,000, 50,000 and 100,000 kw generators utilized in such prior art systems cost hundreds of thousands of dollars, as do the turbines or other equipment required to operate the generators. The solar power or energy which must be produced to operate the generators is significant. Providing thermal sinks or storage for such large amounts of energy is costly. Third, prior art systems ordinarily do not have the ability to track the sun throughout the day and, importantly, to deliver collected sunlight to a fixed sealed opening in a pressurized heat storage unit. Fourth, when fluid circuits are utilized in solar energy heat transfer systems, pumps are commonly utilized to provide the motive power to push the fluid through the circuit. The foregoing cost and energy requirements tend to make solar energy electricity generating systems complicated and impractical, especially for the large scale generation of electricity. The use of solar energy is, however, very desirable because such energy is readily available and does not require the destruction of land to extract the energy source, because such energy in its original form is a clean non-polluting source of energy, and because such energy ordinarily does not produce toxic or dangerous by-products when the energy is processed or utilized.

Accordingly, it would be highly desirable to provide an improved energy electricity generating system which would require a minimal land area in which to receive sunlight and generate a substantial amount of electricity, which would be relatively inexpensive in manufacture and maintenance, which could track the sun throughout the day and deliver sunlight through and seal a fixed opening in a pressurized heat storage chamber, and which could utilize a closed fluid circuit to transfer the heat required to operate electric generator without requiring a pump to move the liquid through the circuit.

Therefore, it is a principal object of the invention to provide an improved solar energy collection system for generating electricity.

Another object of the invention is to provide an improved solar energy system which can be erected and operated on a relatively small parcel of land to produce a significant amount of electricity.

Still another object of the invention is to provide an improved solar energy system which utilizes a concentrated beam of sunlight to heat, seal and pressurize a thermal storage chamber which is lined with a heat sink material.

Yet still another object of the invention is to provide an improved solar energy system in which the capital equipment outlays are a small portion of the outlays ordinarily required in conventional solar energy electricity generating systems.

A further object of the invention is to provide an improved solar energy system in which heat directly provides the motive power required to move fluid through a heat transfer circuit utilized in the system.

These and other, further and more specific objects and advantages of the invention will be apparent to those skilled in the art from the following detailed description thereof, taken in conjunction with the drawing.

Briefly, in accordance with my invention, I provide an improved solar energy system for generating electricity. The system includes heat storage means comprising an enclosed chamber lined with heat sink material and including an opening shaped and dimensioned to permit a concentrated beam of sunlight to pass therethrough while maintaining a pressure in the heat storage means in excess of the ambient air pressure; means for collecting and concentrating solar energy including frame means, a plurality of mirror means each mounted on the frame means for sequentially reflecting and concentrating sunlight to produce a beam of sunlight, means operatively associated with the frame means and the mirror means for adjusting the position of the plurality of mirror means track the sun across a selected arc in the sky and continue to receive and concentrate sunlight while the sun is in the arc and such that the beam of sunlight produced by the plurality of mirror means is continuously directed through the opening into the storage means; a turbine powered by fluid in the gaseous state and including a fluid input and a fluid output; an electrical generator connected to and powered by the turbine; and, a closed heat powered circulating system for circulating a fluid between the turbine and heat storage means. The circulating system includes fluid cooling means for liquefying fluid flowing in the gaseous state out of the exhaust of the turbine; heat conductive container means in the storage means for conductively transmitting heat from within the storage means through the container means to a fluid in a liquid state in said container means to increase the temperature of the fluid and cause the fluid to assume a gaseous state and increase the pressure in the container means; a first conduit interconnecting the container means and the turbine to deliver heated fluid under pressure and in a gaseous state from the container means to the turbine to power the turbine; a second conduit interconnecting the exhaust of the turbine and the cooling means to carry fluid leaving the turbine in a gaseous state to the cooling means; and, a third conduit interconnecting the cooling means and the storage means to carry fluid in a liquid form from the cooling means to the container means to absorb heat to take on a gaseous state and travel through the first conduit to the turbine to power the turbine. The power for causing fluid to circulate through the closed circulating system is supplied by the heating and expansion of the fluid which occurs in the container means. The system also includes valve means in at least one of the first, second, and third conduits for controlling the flow of fluid through the circulating system.

Turning now to the drawing, which depicts the presently preferred embodiments of the invention for the purpose of illustrating the practice thereof and not by way of limitation of the scope of the invention, a solar energy electricity generating system constructed in accordance with the principles of the invention is illustrated in the drawing and includes the vertically oriented parabolic mirror stack assembly 10. Assembly 10 includes a circular panel base 11 and upwardly projecting structural member 12, 13 fixedly attached to base 11. Vertically stacked parabolic mirrors 14, 15, 16, 17 are each movably attached to one of structural members 12 and 13. Means (not shown) are provided for tilting each mirror about a horizontal axis and about a vertical axis. Each mirror 14 to 17 can be tilted independently of the other mirrors. Means (not shown) is also provided for rotating base 11 in the direction of arrow A about a vertical axis which is parallel to structural member 12 and 13. Members 12 and 13 are perpendicular to base 11. The rotatability of base 11 (and consequently of members 12 and 13) and the ability to independently adjust each parabolic mirror 14 to 17 enable assembly 10 to track the sun along a selected path or arc of travel across the sky and to produce a concentrated beam of sunlight which is directed through opening 18 into the enclosed heat storage chamber 20. Each parabolic mirror 14 to 17 is shaped and dimensioned to reflect and focus or concentrate light. By way of example, mirror 14 can have a thirty inch outer diameter, mirror 15 can have a twenty four inch outer diameter, mirror 16 can have an eighteen inch outer diameter and mirror 17 can have a twelve inch outer diameter. The focal length of mirror 14 is longer than the distance from mirror 14 to 15; the focal length of mirror 15 is longer than the distance from mirror 15 to mirror 16; and, the focal length of mirror 16 is longer than the distance from mirror 16 to mirror 17. Consequently, sunlight 21 is received and reflected by mirror 14. The sunlight reflected and concentrated by mirror 14 is gradually converged and concentrated as it is sequentially reflected off of mirror 14, mirror 15, mirror 16, and mirror 17 in the manner indicated in the drawing. Assembly 10 is within a space envelope which is six feet wide, six feet long, and fifteen feet high. Preferably, assembly 10 is within a space envelope which is three feet wide, three feet long, and ten feet high, e.g., in the presently preferred embodiment of the invention the diameter of circular base 11 is three feet and each structural member 12 and 13 is ten feet high. The vertical stacking of parabolic mirrors 14 to 17 is a crucial feature in the invention because it facilitates the gathering and concentration of sunlight on a relatively small area of land and permits the sun to be tracked while the concentrated beam of light 22 produced by the mirrors is continuously directed through the fixed opening 18 into chamber 20. In this regard, standard flat mirror reflectors are not acceptable in the practice of the invention, both because such mirrors do not concentrate sunlight and because such mirrors cover too much area above the ground to be useful in the practice of the invention. Similarly, simply reflecting sunlight off of a flat or slightly curved mirror surface to a single focal point is not desirable in the invention. A "cascading" vertically stacked series of mirrors is required so that sunlight can be gradually concentrated and so that the sun can be tracked by altering the position of the mirrors. As would be appreciated by those of skill in the art, the means for controlling the movement of mirrors 14 to 17 and base 11 so assembly 10 tracks the sun can include manual controls, can comprise a computer controlled motor system, or can comprise any other desirable means.

Opening 18 is generally circular and is shaped and dimensioned such that beam 22 seals opening 18 and permits a pressure greater than the ambient air pressure to exist in chamber 20. The pressure in chamber 20 ordinarily does not exceed about 25 psi and normally is about 16 psi to 20 psi. The shaping of opening 18 to conform to beam 22 is an important part of the invention because such shaping of opening 18 prevents heat from escaping through opening 18 from within chamber 20 and prevents chamber 20 from depressurizing. The pressure developed in chamber 20 facilitates the heating of chamber 20. Shaping opening 18 in the form of an elongate slot is not acceptable in the practice of the invention because attempting to continuously direct an elongate beam of concentrated sunlight through an elongate slot while tracking the sun is not practicable. Ceramic tiles 23 or other heat sink material line an inner steel shell on the interior of chamber 20. Tiles 23 presently preferably comprise ceramic refractory tiles such as alumina, magnesium oxide, silica, silicon carbide, or zirconium oxide. The temperature in chamber 20 can be in the range of 1,000° F. to 15,000° F. Most known materials, even the most heat resistant refractories, are destroyed above 15,000° F. Beam 22 presently preferably has a temperature in excess of 2,000° F. and heats chamber 20 to a temperature in the range of 2,000° F. to 5,000° F. The outer shell or casing of chamber 20 is fabricated from a mixture of concrete and pumice which is applied to the outside of the steel shell, and can be fabricated from any other desired material. The outer good casing of chamber 20 preferably has good thermal insulation values. Chamber 20 is within a space envelope which is eight feet wide, fifteen feet long, and eight feet high. Preferably, chamber 20 is within a space envelope which is six feet wide, ten feet long, and six feet high, e.g., in the presently preferred embodiment of the invention chamber 20 comprises a cylindrically shaped hollow unit which has a diameter of six feet and is ten feet long. While the size of chamber 20 can exceed the eight feet by fifteen feet by eight feet envelope, restricting the size of the chamber 20 is important in enabling the compact, efficient system of the invention to be operated on a small parcel of land.

Evaporator coil or fluid container 24 is positioned inside of chamber 20. Conduit 24 connects coil 24 to the fluid input of turbine 26. Conduit 27 connects the fluid exhaust or output of turbine 26 to cooling coil 28. Conduit 29 interconnects cooling coil 28 to compressor 30. Conduit 31 interconnects valve 34 and conduit length or fluid container 33. Conduit 35 interconnects valve 36 and fluid container 33. Fluid flows through conduits 25, 27, 29, 31, 35 in the manner indicated by arrows B, C, D, E, F, G, and H. Valve 34 is normally adjusted so fluid flows either through evaporator coil 24 or through conduit length 33. When fluid flows through valve 34 through evaporator coil 24 (and not through conduit 32), valve 36 is adjusted to permit fluid to flow from coil 24 to the input of turbine 26 and to prevent fluid from flowing through conduit 35 and valve 36 into conduit 25. When fluid flows through valve 34 into conduit 35 (and not into coil 24), valve 36 is adjusted to permit fluid to flow through conduit 35 and valve 36 into conduit 25 and to prevent fluid from flowing from conduit 25 through valve 36 to turbine 26.

Evaporator coil 24 can, if desired, be replaced by a boiler. Liquid flows through conduit 31 into the boiler. As the liquid in the boiler absorbs heat, gas is formed. The gas is directed from the boiler into conduit 25 and to turbine 26. When such a boiler is utilized, the liquid in the boiler functions as a heat sink and facilitates the storage of heat in chamber 20.

As an alternative to the afore-mentioned boiler or the evaporator coil 24, the flange 37 can be utilized to transfer heat from within chamber 20 to fluid traveling through fluid container or conduit length 33. The inner surface of flange 37 is lined with heat sink material and valves 38 and 39 are positioned in flange 37. Valves 38 and 39 are utilized to control the flow of heat in the direction of arrow I through valves 38 and 39 to fluid container 33.

Turbine 26 is coupled to and drives electric generator 40. Turbine 26 is within a space envelope which is three feet wide, five feet long, and three feet high. Preferably turbine 26 is within a space envelope which is two feet wide, four feet long, and two feet high. Generator 40 is in a space envelope which is three feet wide, five feet long, and three feet wide. Preferably generator 40 is in a space envelope which is two feet wide, four feet long, and two feet wide.

Generator 40 is a 1,000 kw/hr to 8,000 kw/hr generator, and preferably is a 1,000 kw/hr to 3,000 kw/hr generator. The utilization of small generators of the size of 1,000 kw/hr to 3,000 kw/hr is central to the electricity generating system of the invention. The small scale compact solar energy collection system of the invention cannot readily power larger conventional electrical generators of the size which generate 10,000 kw/hr or more electricity. Further, the cost of such large generators is great and rapidly makes the complexity, cost and practicality of solar energy electricity generating problems prohibitive. Since the power rating of a turbine is generally equivalent to the size of generator which the turbine is driving, turbine 26 is a 1,000 kw/hr to 8,000 kw/hr turbine, and preferably is a 1,000 kw/hr to 3,000 kw/hr turbine.

The closed circuit fluid heat transfer system of the type utilized in the apparatus of the drawing is central to the invention and does not require the utilization of a mechanical pump, except possibly to direct a resupply of fluid into the closed circuit. The fluid utilized in the closed circuit can be any desired heat transfer liquid, including freon, salt water, etc. An aqueous solution of 50% by weight or less 2-methyl-propanol-2 is presently preferred because the boiling point of the 2-methyl-propanol-2 (hereafter called butanol) is about 180° F. The low "flash" point of the butanol reduces the amount of heat required to boil the aqueous solution. The fluid flow through the closed conduit 25, 27, 29, 31, 35 circuit of the drawing will now be described assuming valves 34 and 36 are set such that fluid does not flow through evaporator 24 but instead flows through fluid container 33. The temperature in the chamber 20 is, in order for the system to operate to circulate a 25% by weight butanol aqueous solution, in excess of about 400° F. During the day, the temperature in chamber 20 rapidly reaches a point in excess of 2000° F. Valves 38 and 39 are adjusted so the temperature of fluid container 33 is about 400° F. and so that the butanol—water liquid solution flowing into container 33 vaporizes, increasing the temperature and pressure of the fluid. The heat absorbed by the fluid in container 33 and the increase in temperature and pressure of the fluid provides motive power to move the fluid through the closed circuit. The heated, pressurized fluid from container 33 moves through conduit 35, through valve 36, and through the input of turbine 26 to power turbine 26 and, consequently, to turn electrical generator 40. Power produced by generator 40 can be directed into existing electrical transmission lines, to batteries, etc. Spent gaseous fluid moves through the exhaust port of turbine 26 into conduit 27 and through cooling coil 28. Cooling coil 28 preferably cools the fluid sufficiently to liquefy the fluid so that a compressor need not be included as part of the cooling means in the closed circuit. Coil 28 presently courses through and is cooled by the ambient air. Means other than ambient air can be used to cool coil 28. If a compressor is required as part of the cooling means it can be in the form of a valve 41 which restricts the flow of fluid and compresses the fluid to facilitate liquefication of the fluid. Any other conventional desirable compressor means can be utilized. The compressor can also comprise a series 30 of conduit which sequentially grows smaller in cross sectional area in order to compress the fluid. Fluid from coil 38 and, if appropriate, from compressor 30 and/or 41, flows through conduit 31, through valve 34, through conduit 32, and back into fluid container 33 and the cycle is repeated. When evaporator coil 24 is utilized instead of fluid container 33, the movement of fluid through the closed circuit is very similar to that just described for the movement of fluid through the circuit when fluid container 33 is utilized to transfer heat from chamber 20 to the fluid.

A valve (not shown) is supplied for opening 18 so that opening 18 may be closed during nighttime or when there is not sufficient sunlight available to direct a beam 22 into chamber 20 which has a temperature in excess of a selected temperature.

The rate of fluid flow through the closed circuit is in the range of 10 gallons per minute to 300 gallons per minute, preferably about seventy five to one hundred gallon per minute. When an aqueous solution of about 25% by weight butanol is utilized, the temperature of fluid leaving container 33 is about 270° F. to 300° F. and the pressure of the fluid is about 165 psi to 180 psi. After the fluid from container 33 has flowed through turbine 26, the temperature of the fluid has dropped about 100° F. to 200° F. and the pressure of the fluid is about 150 psi. Cooling coil 28 reduces the temperature of the fluid just enough to liquefy the fluid. Fluid flowing back into the container 33 therefore has a pressure of about 140 psi and a temperature of around 170° F. The temperature and pressure of the fluid at any particular point in the closed circuit can vary depending on the particular fluid being utilized, on the turbine being utilized, etc. A series of valves is used to control the flow of fluid through the closed circuit. For the sake of simplicity, these valves are not shown in the drawing, but ordinarily, for example, a valve would be included in conduit 25 just prior to turbine 26, a valve would be included in conduit 27 just after the exhaust of turbine 26, a valve would be included in conduit 27 just prior to coil 28, a valve would be included in conduit 29 just after coil 28, a valve would be included in conduit 29 just prior to compressor 30, a valve would be included in conduit 31 just after compressor 30, a valve would be included in conduit 32 just prior to container 33, and a valve would be included in conduit 35 just after container 33. These valves would be in addition to the valves 41, 34, 38, 39, 36 shown in the drawing. Any valves in the closed circuit of the drawing can be manually controlled or can be controlled utilizing a microprocessor. Turbine 26 can be a single stage turbine or can be a multi-stage turbine. Ordinarily, a single stage turbine is utilized for generators up to 1,000 kw/hr in size, while a multi-stage turbine is utilized for generators having a size in excess of about 1,000 kw/hr.

By way of further example, the heat transfer fluid flowing through the closed circuit in the drawing can also comprise butanol-1, butanol-2, 2-methyl-propanol-1, ethyl alcohol, or other fluids which are vaporized when they pass through evaporator coil 24 or fluid container 33.

An important advantage of flange 37 is that maintenance is simplified because flange 37 preferably is removably connected to chamber 20. Consequently, to maintenance valves 38, 39, or container 33, flange 37 can simply be removed from chamber 20. When evaporator coil 24 or a boiler is utilized, access must be gained to the main chamber 20, which typically is more time consuming and costly than simply removing flange 37.

Having described my invention in such terms as to enable those skilled in the art to understand and practice it, and having identified the presently preferred embodiments thereof, I claim:

1. A system for generating electricity, comprising
   (a) heat storage means comprising
      (i) an enclosed primary chamber lined with heat sink material and including an opening shaped and dimensioned to permit a concentrated beam of sunlight to pass therethrough into said chamber while maintaining a pressure in said primary chamber in excess of ambient air pressure,
      (ii) at least one enclosed secondary chamber smaller than and connected to said primary chamber and shaped and dimensioned to permit heat to flow from said primary chamber outwardly into said secondary chamber;
   (b) means for collecting and concentrating solar energy including
      (i) a frame,
      (ii) a series of vertically stacked arcuate light-converging mirrors each mounted on said frame for sequentially reflecting and progressively increasing the concentration of sunlight by cascading in a zig-zag fashion sunlight through said series of mirrors to produce a beam of sunlight,
      (iii) means operatively associated with said frame and said mirrors for rotating said frame and adjusting the position of said series of mirrors and said frame such that
         at least one of said series of mirrors tracks the sun across a selected arc in the sky and continues to receive and concentrate sunlight, while said sun is in said arc, and
         said beam of sunlight produced by said series of mirrors is continually directed through said opening into said storage means;
   (c) a turbine powered by fluid in the gaseous state and including a fluid input and a fluid output;
   (d) an electrical generator connected to and powered by said turbine;
   (e) a closed, heat powered circulating system for circulating a fluid between said turbine and said heat storage means, said circulating system including
      (i) fluid cooling means for liquefying fluid flowing in the gaseous state out of said exhaust of said turbine,
      (ii) heat conductive container means in said secondary chamber of said storage means for conductively transmitting heat from within said storage means through said container means to a fluid in a liquid state in said container means to increase the temperature of the fluid and cause the fluid to assume a gaseous state and increase the pressure in said container means,
      (iii) a first conduit interconnecting said container means and said turbine to deliver heated fluid under pressure and in a gaseous state from said container means to said turbine to power said turbine,
      (iv) a second conduit interconnecting said exhaust of said turbine and said cooling means to carry fluid leaving said turbine in a gaseous state to said cooling means,
      (v) a third conduit interconnecting said cooling means and said storage means to carry fluid in a liquid form from said cooling means to said container means to absorb heat to take on a gaseous state and travel through said first conduit to said turbine to power said turbine,
      the power for causing fluid to circulate through said closed circulating system being supplied by the heating and expansion of said fluid occurring in said container means;
   (f) valve means in at least one of said first, second and third conduit for controlling the flow of fluid through said circulating system; and,
   (g) control means in said storage means for controlling the flow of heat from said primary chamber to said secondary chamber.

2. The system of claim 1 wherein said control means comprises valve means.

3. The system of claim 1 wherein said electrical generator produces 1000 kw/hr to 3000 kw/hr.

4. The system of claim 1 wherein
   (a) said primary chamber has an outer surface; and,
   (b) said secondary chamber is removably attached to said outer surface of said primary chamber to facilitate the temporary removal and maintenance of said secondary chamber.

5. The system of claim 1 wherein
   (a) said opening is circular; and,
   (b) said pressure in said primary chamber is in the range of 16 psi to 25 psi.

6. The system of claim 5 wherein said secondary chamber is removably attached to said primary chamber.

7. A system for generating electricity, comprising
   (a) heat storage means comprising an enclosed chamber lined with heat sink material and including an opening shaped and dimensioned to permit a concentrated beam of sunlight to pass therethrough into said chamber while maintaining a pressure in said primary chamber in excess of ambient air pressure;
(b) means for collecting and concentrating solar energy including
  (i) frame means,
  (ii) a series of arcuate light-converging mirrors each mounted on said frame means for sequentially reflecting and progressively increasing the concentration of sunlight by cascading sunlight through said series of mirrors to produce a beam of sunlight,
  (iii) means operatively associated with said frame means and said mirrors for rotating said frame and adjusting the position of said series of mirrors and said frame means such that
    at least one of said series of mirrors tracks the sun across a selected arc in the sky and continues to receive and concentrate sunlight while said sun is in said arc, and,
    said beam of sunlight produced by said series of mirrors is continually directed through said opening into said storage means;
  said collecting means lying with a second size envelope having width, length and height dimensions, one of said dimensions of said second size envelope being about twelve feet, each of the other remaining of said dimensions of said second size envelope being about four feet;
(c) a turbine powered by fluid in the gaseous state and including a fluid input and a fluid output, said turbine lying within a third size envelope having width, length, and height dimensions, one of said dimensions of said third size envelope being about five feet, each of the other remaining of said dimensions of said third size envelope being about three feet;
(d) an electrical generator connected to and powered by said turbine, said generator lying within a fourth size envelope having width, length, and height dimensions, one of said dimensions of said fourth size envelope about five feet, each of the other remaining of said dimensions of said fourth size envelope being about three feet;
(e) a closed, heat powered circulating system for circulating a fluid between said turbine and said heat storage means, said circulating system including
  (i) fluid cooling means for liquefying fluid flowing in the gaseous state out of said exhaust of said turbine,
  (ii) heat conductive container means in said storage means for conductively transmitting heat from within said storage means through said container means to a fluid in a liquid state in said container means to increase the temperature of the fluid and cause the fluid to assume a gaseous state and increase the pressure in said container means,
  (iii) a first conduit interconnecting said container means and said turbine to deliver heated fluid under pressure and in a gaseous state from said container means to said turbine to power said turbine,
  (iv) a second conduit interconnecting said exhaust of said turbine and said cooling means to carry fluid leaving said turbine in a gaseous state to said cooling means,
  (v) a third conduit interconnecting said cooling means and said storage means to carry fluid in a liquid form from said cooling means to said container means to absorb heat to take on a gaseous state and travel through said first conduit to said turbine to power said turbine,
  the power for causing fluid to circulate through said closed circulating system being supplied by the heating and expansion of said fluid occurring in said container means; and,
(f) valve means in at least one of said first, second and third conduits for controlling the flow of fluid through said circulating system.

8. The system of claim 7 wherein said electrical generator produces 1000 kw/hr to 3000 kw/hr.

9. A system for generating electricity, comprising
(a) heat storage means comprising a primary enclosed chamber lined with heat sink material and including an opening shaped and dimensioned to permit a concentrated beam of sunlight to pass therethrough into said chamber while maintaining a pressure in said primary chamber in excess of ambient air pressure;
(b) means for collecting and concentrating solar energy including
  (i) frame means,
  (ii) a series of arcuate light converging mirror means each mounted on said frame means for sequentially reflecting and progressively increasing the concentration of sunlight by cascading sunlight through said series of mirrors to produce a beam of sunlight,
  (iii) means operatively associated with said frame means and said mirror means for adjusting the position of said series of mirror means and said frame means such that
    at least one of said series of mirror means tracks the sun across a selected arc in the sky and continues to receive and concentrate sunlight while said sun is in said arc, and,
    said beam of sunlight produced by said series of mirror means is continually directed through said opening into said storage means;
(c) a turbine powered by fluid in the gaseous state and including a fluid input and a fluid output;
(d) an electrical generator connected to and powered by said turbine;
(e) a closed, heat powered circulating system for circulating a fluid between said turbine and said heat storage means, said circulating system including
  (i) fluid cooling means for liquefying fluid flowing in the gaseous state out of said exhaust of said turbine,
  (ii) heat conductive container means in said storage means for conductively transmitting heat from within said storage means through said container means to a fluid in a liquid state in said container means to increase the temperature of the fluid and cause the fluid to assume a gaseous state and increase the pressure in said container means,
  (iii) a first conduit interconnecting said container means and said turbine to deliver heated fluid under pressure and in a gaseous state from said container means to said turbine to power said turbine,
  (iv) a second conduit interconnecting said exhaust of said turbine and said cooling means to carry fluid leaving said turbine in a gaseous state to said cooling means, (v) a third conduit interconnecting said cooling means and said storage means to carry fluid in a liquid form from said cooling means to said container means to absorb heat to take on a gaseous state and travel through said first conduit to said turbine to power said turbine, the power for causing fluid to circulate through said closed circulating system being supplied by the heating and expansion of said fluid occurring in said container means; and, (f) valve means in at least one of said first, second and third conduits for controlling the flow of fluid through said circulating system.

10. The system of claim 9 wherein said heat storage means includes
 (a) an enclosed secondary chamber smaller than and connected to said primary chamber and shaped and dimensioned to permit heat to flow from said primary chamber and said secondary chamber; and,
 (b) control means for controlling the flow of heat from said primary chamber to said secondary chamber.

11. The system of claim 10 wherein said control means comprises valve means.

12. The system of claim 9 wherein
 (a) said opening is circular; and,
 (b) said pressure in said primary chamber is in the range of 16 psi to 25 psi.

* * * * *